US011959609B2

(12) United States Patent
Chen et al.

(10) Patent No.: US 11,959,609 B2
(45) Date of Patent: Apr. 16, 2024

(54) LENS UNIT, AUXILIARY LOW-BEAM MODULE, LENS, LOW-BEAM ILLUMINATION MODULE AND VEHICLE

(71) Applicant: HASCO VISION TECHNOLOGY CO., LTD., Shanghai (CN)

(72) Inventors: Xiangqian Chen, Shanghai (CN); Zhaoyu Chen, Shanghai (CN); Guomin Xu, Shanghai (CN); Tao Zhang, Shanghai (CN); Ying Li, Shanghai (CN); He Zhu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/926,019

(22) PCT Filed: Jun. 16, 2021

(86) PCT No.: PCT/CN2021/100229

§ 371 (c)(1),
(2) Date: Nov. 17, 2022

(87) PCT Pub. No.: WO2022/001657

PCT Pub. Date: Jan. 6, 2022

(65) Prior Publication Data

US 2023/0175663 A1 Jun. 8, 2023

(30) Foreign Application Priority Data

Jul. 2, 2020 (CN) ........................ 202021292712.2

(51) Int. Cl.
*F21S 41/26* (2018.01)
*F21W 102/135* (2018.01)

(52) U.S. Cl.
CPC ........ *F21S 41/26* (2018.01); *F21W 2102/135* (2018.01)

(58) Field of Classification Search
CPC .......... F21S 41/25; F21S 41/255; F21S 41/26; F21S 41/265; F21S 41/27; F21S 41/275; F21S 41/28; F21S 41/285
See application file for complete search history.

(56) References Cited

U.S. PATENT DOCUMENTS

2019/0226655 A1* 7/2019 Shimano ............ G02B 19/0047

FOREIGN PATENT DOCUMENTS

CN 108224356 A 6/2018
CN 108375033 A 8/2018
(Continued)

OTHER PUBLICATIONS

International Search Report, China National Intellectual Property Administration, Application No. PCT/CN2021/100229, dated Aug. 27, 2021, 4 pages, English Translation, 2 pages.
(Continued)

*Primary Examiner* — Robert J May
(74) *Attorney, Agent, or Firm* — Ziegler IP Law Group

(57) ABSTRACT

A lens unit, a lens for a low-beam illumination module, a low-beam illumination module and a vehicle. The lens unit includes a rear surface and a front surface; the lens unit has a focal line, and the focal line is a straight line perpendicular to a light emitting direction of the lens unit; the rear surface and the front surface are adapted to project light rays passing through the focal line into parallel light rays, and the front surface is a free-form curved surface. The lens unit has the optical characteristics of a cylindrical lens, and is able to cause parallel incident light to be focused into a line instead of a focal point upon passing through the lens unit.

11 Claims, 6 Drawing Sheets

(56) References Cited

FOREIGN PATENT DOCUMENTS

| | | | | | |
|---|---|---|---|---|---|
| CN | 108474534 | A | | 8/2018 | |
| CN | 110440217 | A | | 11/2019 | |
| CN | 210219616 | U | | 3/2020 | |
| CN | 210740274 | U | | 6/2020 | |
| CN | 212746315 | U | | 3/2021 | |
| CN | 108019713 | B | | 12/2021 | |
| DE | 102016118152 | A1 | * | 3/2018 | ............ F21S 41/143 |
| EP | 3550203 | A1 | * | 10/2019 | ............ F21S 41/143 |
| JP | 2014086328 | A | | 5/2014 | |

OTHER PUBLICATIONS

Written Opinion of the International Searching Authority, China National Intellectual Property Administration, Application No. PCT/CN2021/100229, dated Aug. 23, 2021, 5 pages.

* cited by examiner

LENS UNIT, AUXILIARY LOW-BEAM MODULE, LENS, LOW-BEAM ILLUMINATION MODULE AND VEHICLE

CROSS-REFERENCE TO RELATED APPLICATIONS

The present disclosure claims the priority of a Chinese patent application filed with the China Patent Office on Jul. 2, 2020, with the application number 202021292712.2 and entitled as "Lens Unit, Auxiliary Low-beam Module, Lens, Low-beam Illumination module and Vehicle", the entire contents of which are incorporated by reference into the present disclosure.

TECHNICAL FIELD

The aspects of the disclosed embodiments relate to lenses, and in particular, to a lens unit. In addition, the present disclosure also relates to an auxiliary low-beam illumination module including the lens unit, a lens for a low-beam illumination module, a low-beam illumination module, and a vehicle.

BACKGROUND ART

In recent years, LED light sources, thanks to their excellent optical properties, have become the main force of vehicle lighting systems, and are favored by more and more car manufacturers and consumers. However, with pursuit of consumers for the car styling, car lights fulfill no longer a simple illumination function, but more reflect the aesthetic feeling of a car at first glance. The flat design of headlights of a car (the profile shape is narrow and long) has become the development trend at present and in future.

The traditional low-beam has the following design methods: one is, as disclosed in the Chinese invention patent CN108375033A, to form the cutoff line of the low-beam through the shading plate so as to obtain the low-beam light shape. In order to pursue the widening of the low beam, some car lights are supplemented through the additional auxiliary low beam formed by the shading plate. This design idea is mainly used in modules with mirror structures. The module comprises an illumination distance projection unit and an illumination width projection unit. The lighting distance projection unit can make the low-beam light shape meet the requirements of the LED low-beam module for the lighting distance. The lighting width projection unit can make the low-beam light shape meet the requirements of the LED low-beam module for the lighting width. The design process and assembly process of the solution are very cumbersome. During the design and assembly process, the main low-beam and auxiliary low-beam modules are required to be closely incorporated, and otherwise it may lead to the excessive tolerance which does not conform to the regulations. Moreover, most of the LED light sources used in this method are integrated with multiple chips, which are not conducive to the heat dissipation of the LEDs and cause more energy loss. In addition, this solution requires to use a single focus lens of larger size to incorporate the design, which is not conducive to the trend of miniaturization design of vehicle lamps. The second one is to form a low beam by means of a concentrator, as disclosed in Chinese invention patent CN110440217A. The structure is formed on some specific condensers, and finally a low-beam light shape is obtained by imaging of one single focus convex lens. This solution still adopts the traditional design idea. The low-beam light shape is approximately the superposition of the light shapes formed by individual light sources, so that the light emitting direction of each condenser is required to be precisely regulated, and a convex lens of larger size is still used. Both of the above use a traditional convex lens with characteristics of a single focal point (parallel light is incident from the front of the lens and then converges at this one focal point). The low-beam function is achieved by converging the light of plural light sources into the focal plane of the lens (the focal plane is actually curved backward due to field curvature aberration) for imaging. The front surface of the lens has great restrictions on the design, and the diversified design of shape of vehicle lamps cannot be realized. In addition, Chinese invention patent CN108224356A discloses a method for obtaining a multifocal conventional lens by using a common front surface to generate a rear surface. The principle of this solution is to divide the front surface into regions, and each region can be combined with the front surface to form a rear surface, so as to obtain a lens with a specific focal length. The lens formed by this solution has a front surface of the same curvature. The lens formed by each individual region has a unique focus, and the inner surface is not smooth and continuous. This solution requires that each inner curved surface of the lens corresponds to one focal point. The size of the up-down opening of the light emitting surface of the lens cannot be made small, and it is still difficult to achieve a flat design. Secondly, the lens obtained by this method is still a typical spherical lens with a unique focus, which is not conducive to the arrangement of more light sources.

Therefore, it is necessary to design a new type of lens that can reduce the size of the up-down opening of the light emitting surface, realize a flat design, and facilitate heat dissipation arrangement of more light sources.

SUMMARY

The problem to be solved by the present disclosure is to provide a lens unit, which is designed on the basis of a free-form curved surface, and realizes a flattened and diversified design.

Another problem to be solved by the present disclosure is to provide an auxiliary low-beam illumination module. The lens unit of the auxiliary low-beam illumination module is designed on the basis of a free-form curved surface, and realizes the overall flattening and diversified design of the module.

Another problem to be solved by the present disclosure is to provide a lens for a low-beam illumination module. The auxiliary low-beam lens unit of the lens for a low-beam illumination module is designed on the basis of a free-form curved surface, and realizes the overall flattening and diversified design of the lens.

Another problem to be solved by the present disclosure is to provide a low-beam illumination module, and the auxiliary low-beam lens unit of the low-beam illumination module is designed on the basis of a free-form curved surface, and realizes the overall flattening and diversified design of the module.

Another problem to be solved by the present disclosure is to provide a vehicle, the vehicle lamp of which realizes a flattened and diversified design.

In an embodiment, the present disclosure provides a lens unit, comprising a rear surface and a front surface, wherein the lens unit has a focal line, the focal line is a straight line perpendicular to a light emitting direction of the lens unit, the rear surface and the front surface are adapted to project light rays passing through the focal line into parallel light rays, and the front surface is a free-form curved surface.

Preferably, the front surface is formed by sweeping an arc along one preset free curve.

Preferably, the front surface is a free-form curved surface with a smaller up-down dimension and a larger left-right curvature.

Particularly, size of an opening of the lens unit is less than 30 mm.

Preferably, the size of the opening of the lens unit is less than 15 mm.

Preferably, the rear surface is a smooth curved surface.

In another embodiment, the present disclosure provides an auxiliary low-beam illumination module, comprising an auxiliary low-beam primary optical element and the lens unit mentioned above, wherein the focal line is arranged on a lower boundary of a light emitting surface of the auxiliary low-beam primary optical element.

Optionally, light rays emitted by the auxiliary low-beam primary optical element are projected by the lens and then form an auxiliary low-beam light shape with a low-beam horizontal cut-off line, and the auxiliary low-beam light shape can be superimposed with a main low-beam light shape to form a complete low-beam light shape.

In another embodiment, the present disclosure provides a lens for a low-beam illumination module, comprising a main low-beam forming part and an auxiliary low-beam forming part, wherein the main low-beam forming part comprises a main low-beam light incident surface and a main low-beam light emitting surface, the main low-beam light incident surface is formed with at least one point focusing curved surface, the point focusing curved surface and the corresponding main low-beam light emitting surface portion are adapted to project light rays passing through a same point into parallel light rays, and the auxiliary low-beam forming part is the lens unit mentioned above.

Preferably, the main low-beam forming part and the auxiliary low-beam forming part are provided as an integrally-formed member.

Preferably, the main low-beam forming part and the auxiliary low-beam forming part share one light emitting surface, and the light emitting surface is a free-form curved surface.

In another embodiment, the present disclosure provides a low-beam illumination module, comprising the lens for a low-beam illumination module mentioned above, wherein the low-beam illumination module further comprises a main low-beam primary optical element arranged corresponding to the main low-beam forming part and an auxiliary low-beam primary optical element arranged corresponding to the auxiliary low-beam forming part, a focal point of the main low-beam forming part is arranged on a lower boundary of a light emitting surface of the main low-beam primary optical element, and the focal line of the auxiliary low-beam forming part is arranged on a lower boundary of a light emitting surface of the auxiliary low-beam primary optical element.

Optionally, light rays emitted by the main low-beam primary optical element is converged in up, down, left and right directions through the main low-beam forming part and is projected, then a main low-beam light shape with a low-beam inflection point cut-off line having an inflection point is formed after projection; light rays emitted by the auxiliary low-beam primary optical element are projected through the auxiliary low-beam forming part and then form an auxiliary low-beam light shape with a low-beam horizontal cut-off line, and the two are superimposed to form a complete low-beam light shape.

Preferably, the low-beam illumination module comprises a plurality of the main low-beam primary optical elements, and main low-beam light sources corresponding to the plurality of main low-beam primary optical elements are distributed in a stepped shape.

Preferably, the low-beam illumination module further comprises a main low-beam circuit board and a main low-beam radiator, and the main low-beam primary optical element comprises a main low-beam light incident part and a main low-beam light passing part, wherein the main low-beam light incident parts, the main low-beam circuit boards, the main low-beam radiators and the main low-beam light passing parts corresponding to the plurality of the main low-beam primary optical elements are distributed in a stepped shape.

Particularly, size of an opening of the lens for the low-beam illumination module is 10 mm to 15 mm.

In another embodiment, the present disclosure provides a vehicle, comprising the auxiliary low-beam illumination module mentioned above or the low-beam illumination module mentioned above.

With the above technical solutions, the present disclosure achieves at least the following beneficial effects.

The lens unit of the present disclosure has the optical characteristics of a cylindrical lens, which is capable of making the parallel incident light pass through the lens unit and afterwards focus into one line instead of one focal point, so that even if the light emitting surface of the lens unit, that is, the front surface, is a free-form curved surface extending obliquely up and down, it can realize the illumination light shape that meets requirements of vehicle lamp regulations and the light emitting effect will not be affected by the inclination of the front surface, as long as the focal line is a straight line perpendicular to the light emitting direction of the lens unit. The front surface of the lens unit of the present disclosure is a free-form curved surface, and it is capable of making the lens very wide, especially suitable for the lens with low-beam broadening light shape, which enables the low-beam light shape to be wider and more uniform. In addition, the lens unit is suitable for a front surface with a relatively small up-down opening, a relatively large left-right bending curvature, and even with an inclination angle in the up and down directions. Especially for the photoconductive-type vehicle lamp, the rear surface can be obtained according to a given slender front surface extending left and right or extending obliquely and a given focal line, so as to obtain the entire lens unit. Therefore the problem of light allocation can be easily solved and the flattening and diversified design of the headlights is realized, which provides more space for the automobile manufacturers to develop their profile shape and satisfies the diversification of the profile surface of the vehicle lamp.

DESCRIPTION OF REFERENCE NUMERALS

- 1 main low-beam forming part; 11 main low-beam light incident surface;
- 2 auxiliary low-beam forming part; 21 rear surface;
- 22 front surface; 23 focal line;
- 3 main low-beam light source; 31 main low-beam light incident part;
- 32 main low-beam circuit board; 33 main low-beam radiator;
- 34 main low-beam light passing part; 4 auxiliary low-beam light source;
- 41 auxiliary low-beam light incident part; 42 auxiliary low-beam circuit board;
- 43 auxiliary low-beam radiator; 44 auxiliary low-beam light passing part.

DETAILED DESCRIPTION OF EMBODIMENTS

The embodiments of the present disclosure will be described in detail below with reference to the drawings. It should be understood that the embodiments described herein are only used to illustrate and explain the present disclosure, but not to limit the present disclosure.

First of all, it should be noted that in the following description, some directional words, such as "upper", "lower", "front", "rear", etc., involved in order to clearly describe the technical solutions of the present disclosure, have the meanings that are obtained by analogy with the orientation which is normally located relative to a vehicle, when the lens unit is applied to the vehicle. For example, the orientation in which the car head is located is regarded as the front; the orientation in which the car tail is located is regarded as the rear; the orientation in which the car roof is located is regarded as the up; and the orientation in which the car wheel is located is regarded as the down. The "light emitting direction" is the illumination direction of the light rays emitted by the lens unit, and it can be set according to the illumination function of the vehicle lamp to be realized. For example, the light emitting directions of the high-beam and low-beam vehicle lamps point to the front of the vehicle, and the light emitting directions of the corner lights are inclined toward the outside of the vehicle.

In the description of the present disclosure, it should be noted that, unless expressly specified and limited otherwise, the terms "installation" and "connection" should be understood in a broad sense. For example, it may be a fixed connection, a detachable connection, or an integral connection; it can be a direct connection or an indirect connection through an intermediate medium, and it can be an internal communication between two elements or an interaction relationship between two elements. For those skilled in the art, the specific meanings of the above terms in the present disclosure can be understood according to specific situations.

Figure 1:
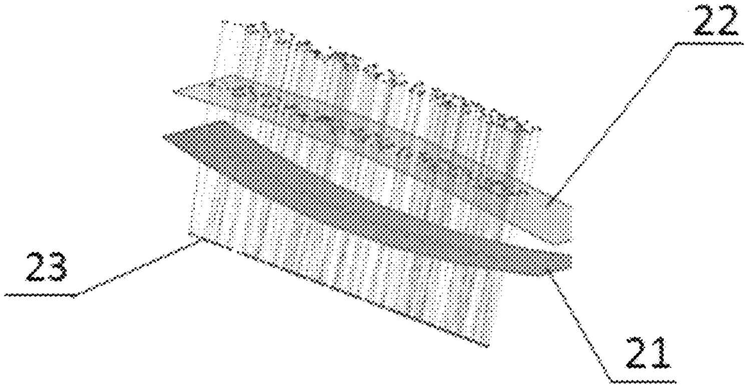
FIG. 1 is a structural diagram of principle of an embodiment of the lens unit of the present disclosure.
Figure 2:
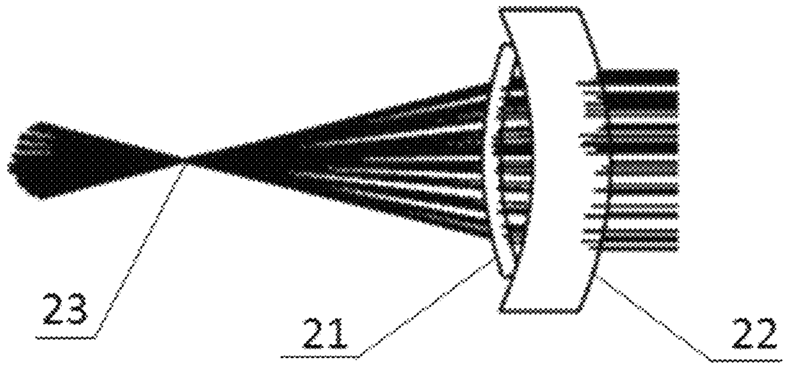
FIG. 2 is a side view of FIG. 1.
Figure 3:
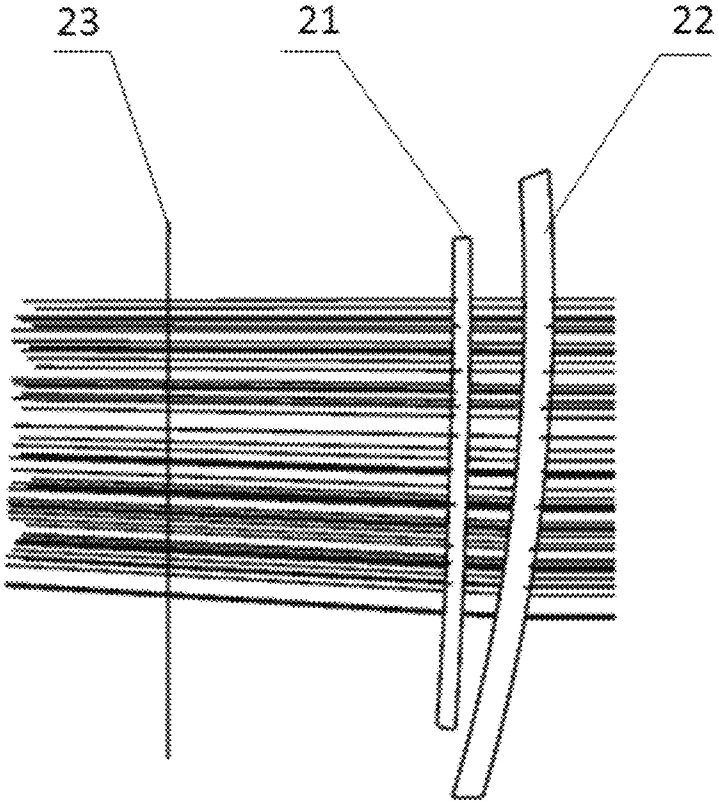
FIG. 3 is a top view of FIG. 2.

Referring to FIGS. 1 to 3, the lens unit of the present disclosure comprises a rear surface 21 and a front surface 22. The lens unit has a focal line 23, the focal line 23 is a straight line perpendicular to the light emitting direction of the lens unit. The focal line 23 is located on a horizontal plane, and the rear surface 21 and the front surface 22 are adapted to project the light rays passing through the focal line 23 into parallel light rays, that is, the parallel light rays enter the lens unit through the front surface 22, and are refracted by the lens unit, and then converges to innumerable focal points. The innumerable focal points gather into one straight line, that is, the focal line 23. The front surface 22 is a free-form curved surface. The front surface 22 can be a given free-form curved surface which is given according to the desired profile shape and specific requirements, or can be a free-form curved surface which is generated by sweeping of an arc along a given free curve. The front surface 22 can be a free-form curved surface with a smaller up-down size, a large left-right bending curvature, and even an inclination angle in the up-down direction. The rear surface 21 is a curved surface. A target curved surface, i.e., the lens rear surface 21 can be finally fitted and obtained according to the given slender front surface 22 extending left and right or obliquely, the given focal line 23 and the light emitting direction, based on the optical refraction law and the fitting principle of curved surface, thereby obtaining the entire lens unit.

The lens unit has the following characteristics. 1. It has the optical characteristics of a cylindrical lens, which can make the parallel incident light pass through the lens unit and then focus into one line, instead of a focal point, so that even if the light emitting surface of the lens unit, that is, the front surface 22, is a free-form curved surface extending up and down obliquely, it can realize the illumination light shape that meets the requirements of the vehicle lamp regulations and the light emitting effect will not be affected by the inclination of the front surface 22, no matter how inclined the light emitting surface is, as long as the focal line 23 is a straight line perpendicular to the light emitting direction of the lens unit through the design of the rear surface. However, for the common long-strip cylindrical surface lens in the prior art, if the light emitting surface is inclined up and down, its focal line will also be inclined followed, and the light shape cut-off line formed by projection will be inclined, and the resulting light shape will be wrong; 2. the focal line 23 can be set in various positions according to the illumination functions to be realized, and it is not necessarily perpendicular to the central axis of the vehicle, that is, extending in the left and right directions, which allows the light sources to be arranged in plural manners, which gives the designer the freedom to design; and 3. opening size of the formed lens unit (the opening size of the lens unit or lens refers to the dimension in upper-lower direction of the lens of the vehicle lamp that can be observed from the front of the vehicle when it is applied to the vehicle lamp) can be made to be less than 30 mm, preferably less than 15 mm, and the specific height can also be determined according to actual requirements.

Figure 4:
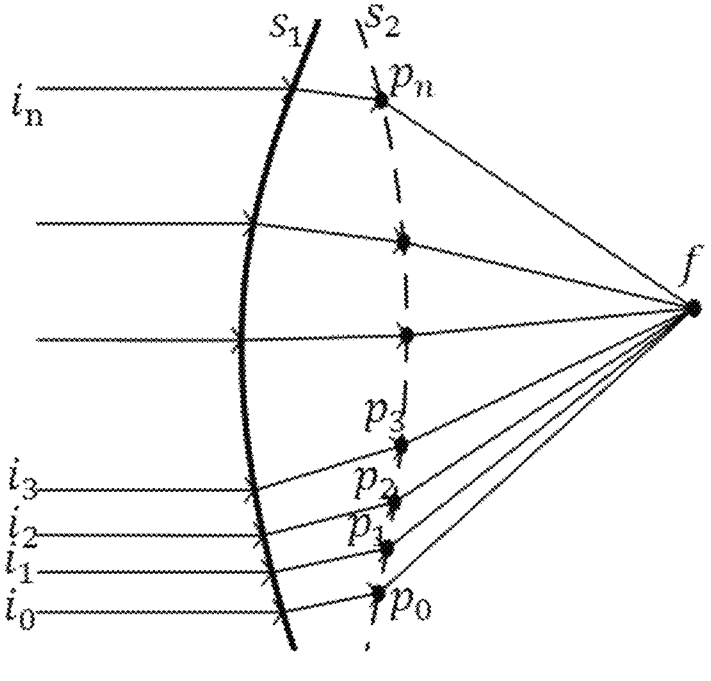
FIG. 4 is a schematic diagram of the design principle of the lens unit of the present disclosure.
Figure 5:
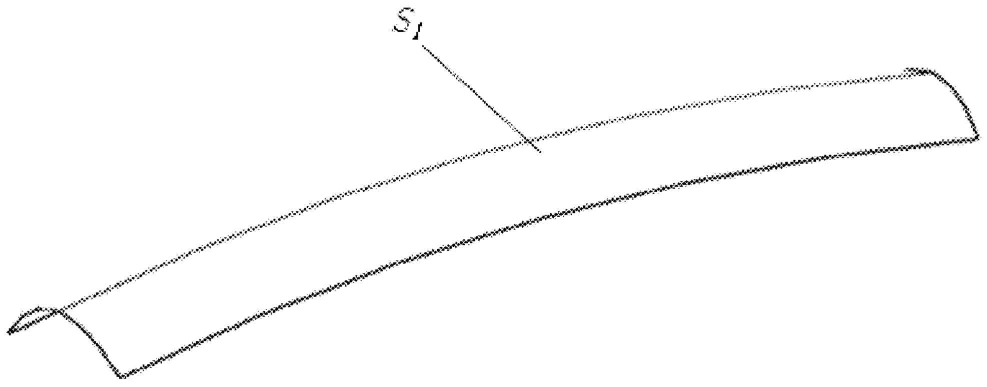
FIG. 5 is a schematic structural diagram of a free-form curved surface used in the design process of the lens unit of the present disclosure.
Figure 6:
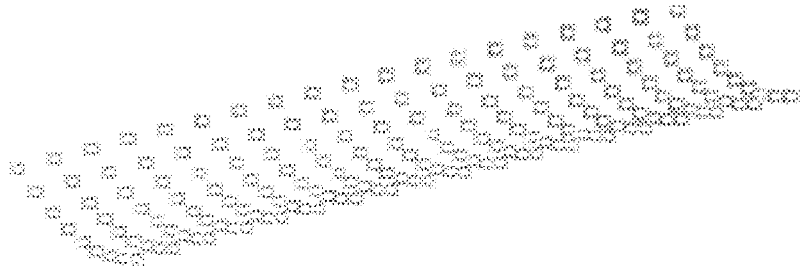
FIG. 6 is a schematic diagram of an exit-point point cloud obtained in the design process of the lens unit of the present disclosure.
Figure 7:
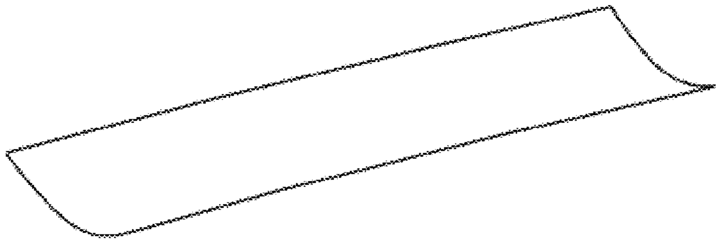
FIG. 7 is a schematic structural diagram of the rear surface obtained in the design process of the lens unit of the present disclosure.

The design process of the above lens will be described in detail below. It is known that the free-form curved surface s1, shown in FIGS. 4 and 5, is the front surface 22. According to the principle of reversibility of the optical path, it is known that all parallel light passes through the front surface 22 and exits the lens unit, and its focal points are distributed on the same focal line 23. As shown in FIG. 4, f is one point on the focal line 23. As shown in FIGS. 4 and 6, the emitting points ($p_0$, $p_1$, $p_2$ . . . $p_n$) are obtained according to several parallel incident light rays ($i_0$, $i_1$, $i_2$ . . . $i_n$) reaching the front surface 22 which is a free-form surface, the given focal line 23, and the preset distances ($d_0$', $d_1$', $d_2$' . . . $d_n$') from the incident points of several parallel incident light rays ($i_0$, $i_1$, $i_2$ . . . $i_n$) to the several preset emitting points ($p_0$', $p_1$', $p_2$' . . . $p_n$'), and then the NURBS (Non-Uniform Rational B-Splines) method is used to obtain the target curved surface $s_2$ shown in FIGS. 4 and 7, that is, the rear surface 21. Wherein the preset distances ($d_0$', $d_1$', $d_2$' . . . $d_n$') can be set according to the thickness of the lens unit to be obtained. Specifically, the calculation method of the emitting points ($p_0$, $p_1$, $p_2$ . . . $p_n$) is as follow. With one incident light ray $i_0$ as an example, according to the optical refraction law, $n_1 \sin \theta_1 = n_2 \sin \theta_2$ (where $n_1$ and $n_2$ are the refractive indices of the two media respectively, and $\theta_1$ and $\theta_2$ are the angle of incidence and angle of refraction respectively), the emitting light ray of the incident light ray $i_0$ is obtained by calculation. The preset emitting point $p_0$' is obtained according to the preset distance $d_0$'. Then the emitting light of the preset emitting point $p_0$' is obtained by calculation according to the law of optical refraction $n_1 \sin \theta_1 = n_2 \sin \theta_2$. If the obtained emitting light ray deviates from the corresponding focal point f on the focal line 23, then the point $p_0$'' is taken at a certain distance along the incident light ray passing through the preset emitting point $p_0$', and the emitting light ray passing through this point is calculated again. It is iteratively converged in this way until the calculated emitting light ray passes through the corresponding focus f. The emitting point corresponding to the final calculated emitting light ray is the point $p_0$ on the rear surface 21.

The rear surface 21 may be a smooth curved surface.

Figure 11:
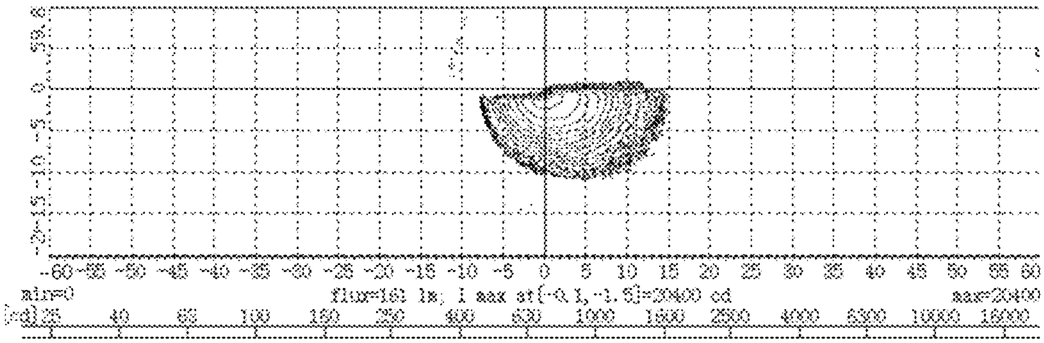
FIG. 11 is the main low-beam light shape which is formed by projection of the low-beam illumination module of the present disclosure.
Figure 12:
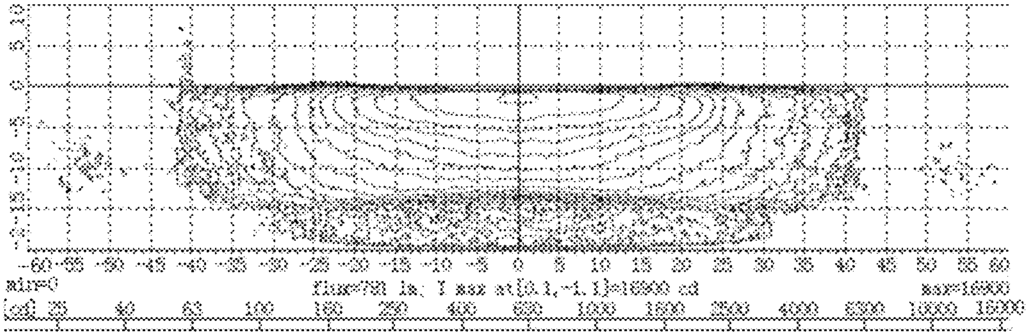
FIG. 12 is an auxiliary low-beam light shape which is formed by projection of the low-beam illumination module of the present disclosure.

In another embodiment, the present disclosure provides an auxiliary low-beam illumination module. The auxiliary low-beam illumination module comprises an auxiliary low-beam primary optical element and the above-mentioned lens unit. The focal line 23 of the lens unit is arranged on the lower boundary of the light emitting surface of the auxiliary low-beam primary optical element. The light rays emitted by the auxiliary low-beam primary optical element are projected through the lens unit and then form an auxiliary low-beam light shape with a low-beam horizontal cut-off line as shown in FIG. 12. The auxiliary low-beam light shape can be superimposed with the main low-beam light shape to form a complete low-beam light shape. The main low-beam light shape can be the main low-beam light shape which is formed by projection of the conventional main low-beam module. For example, it can be the main low-beam light shape as shown in FIG. 11.

Figure 8:
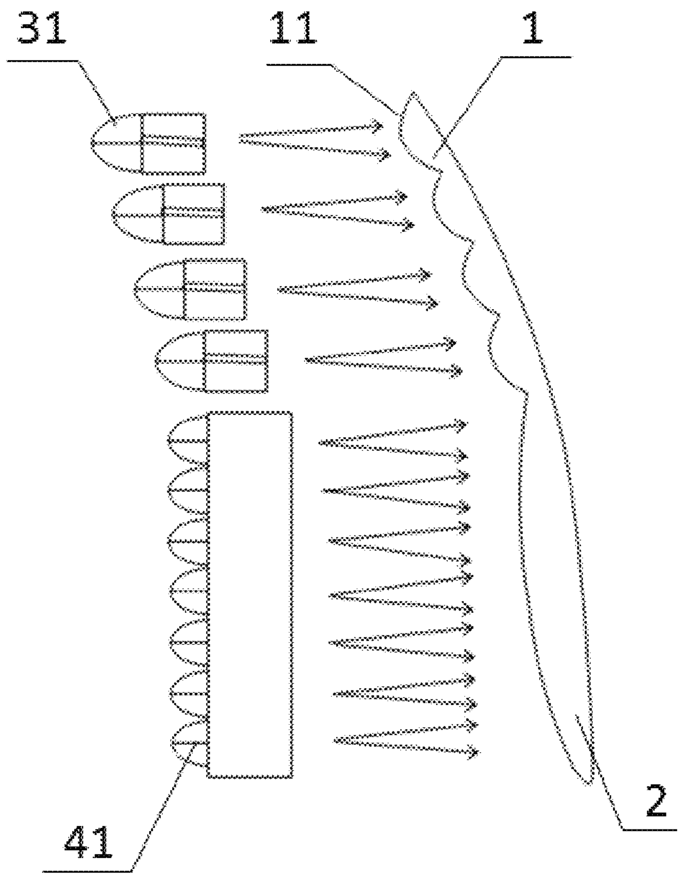
FIG. 8 is a positional relationship diagram of a primary optical element and a lens in an embodiment of the low-beam illumination module of the present disclosure.
Figure 9:
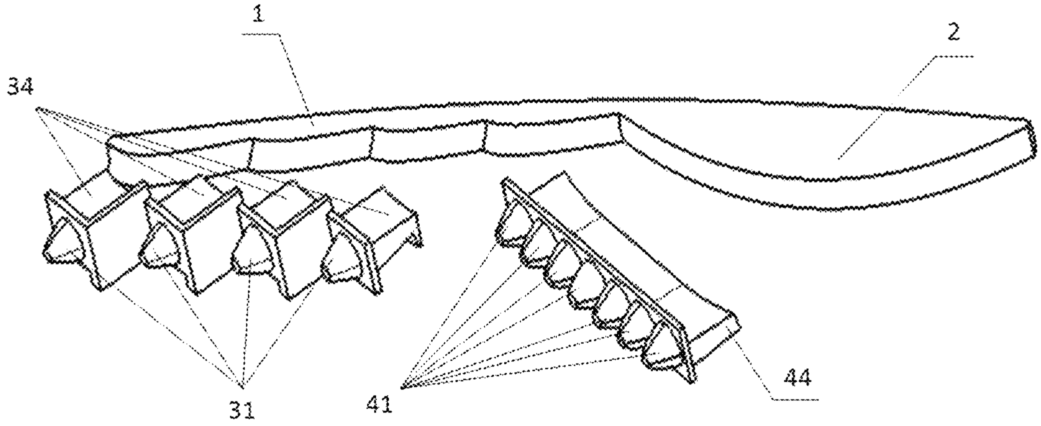
FIG. 9 is the first one of the schematic structural views of an embodiment of the low-beam illumination module of the present disclosure.
Figure 10:
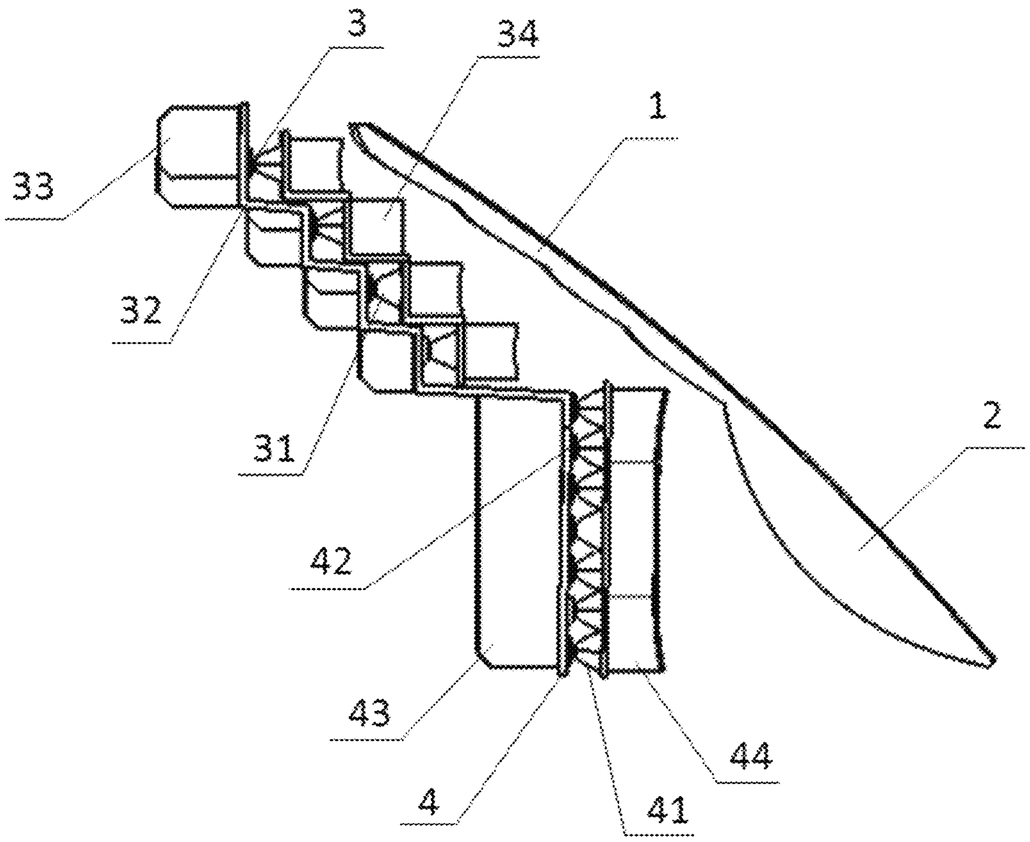
FIG. 10 is the second one of the structural schematic diagrams of an embodiment of the low-beam illumination module of the present disclosure.

In another embodiment, the present disclosure provides a lens for a low-beam illumination module. As shown in FIGS. 8 to 10, the lens for a low-beam illumination module comprises a main low-beam forming part 1 and an auxiliary low-beam forming part 2, wherein the main low-beam forming part 1 comprises a main low-beam light incident surface 11 and a main low-beam light emitting surface, the main low-beam light incident surface 11 is formed with at least one point focusing curved surface, the point focusing curved surface and corresponding portion of the main low-beam light emitting surface are suitable for projecting the light rays passing through the same point into parallel light rays, and the auxiliary low-beam forming part 2 is the above-mentioned lens unit.

Preferably, the main low-beam forming part 1 and the auxiliary low-beam forming part 2 are provided as an integrally formed member, and the main low-beam forming part 1 and the auxiliary low-beam forming part 2 share one light emitting surface. The light emitting surface is a free-form curved surface, which can be obtained according to the profile shape requirements of the low-beam illumination module, and the front surface 22 is a part of the light emitting surface. On the one hand, it is convenient for the precise positioning of the main low-beam forming part 1 and the auxiliary low-beam forming part 2; and one the other hand, a dark area between the main low-beam forming part 1 and the auxiliary low-beam forming part 2 can be avoided when the vehicle lamps are turned on, in the case of being viewed from the front of the vehicle lamps.

In another embodiment, the present disclosure provides a low-beam illumination module. As shown in FIGS. 9 to 10, the low-beam illumination module comprises the above-mentioned lens for a low-beam illumination module, and the low-beam illumination module also comprises a main low-beam primary optical element arranged corresponding to the main low-beam forming part 1 and an auxiliary low-beam primary optical element arranged corresponding to the auxiliary low-beam forming part 2. The focal point of the main low-beam forming part 1 corresponding to the main low-beam primary optical element is arranged on the lower boundary of the light emitting surface of the main low-beam light passing part 34 in the main low-beam primary optical element. The focal line 23 of the auxiliary low-beam forming part 2 is arranged on the lower boundary of the light emitting surface of the auxiliary low-beam light passing part 44 in the auxiliary low-beam primary optical element. The light rays emitted by the main low-beam primary optical element are converged in the up, down, left, and right directions through the main low-beam forming part 1. After projection, a main low-beam light shape with a low-beam inflection point cut-off line having an inflection point is formed, as shown in FIG. 11; and after the light rays emitted by the auxiliary low-beam primary optical element are projected through the auxiliary low-beam forming part 2, an auxiliary low-beam light shape with a low-beam horizontal cutoff line is formed, as shown in FIG. 12, and the two are superimposed to form a complete low-beam light shape.

As for the auxiliary low-beam, it is only required that the light emitting direction is straight ahead, and the light emitting direction of the auxiliary low-beam light incident part 41 is not needed to be adjusted and controlled. The above-mentioned lens unit can ensure that the focal points are located on the same straight line, so that the auxiliary low-beam light sources 4 can be arranged along the straight line, and can be arranged on the same auxiliary low-beam circuit board 42, which is more conducive to the design and heat dissipation of the auxiliary low-beam radiator 43. Moreover, the auxiliary low-beam light incident part 41, the auxiliary low-beam circuit board 42, the auxiliary low-beam radiator 43, and the auxiliary low-beam light passing part 44 should correspond to the auxiliary low-beam light source 4.

Due to the relatively small opening size of the light emitting surface of the lens, in order to make the brightness of the main low-beam meet the requirements, the low-beam module comprises a plurality of main low-beam primary optical elements, each of which corresponds to one focal point. Since the individual focal points are not located on the same straight line, the corresponding main low-beam light sources 3 cannot be arranged in a same plane, and need to be distributed in a stepped shape. The main low-beam light incident part 31, the main low-beam circuit board 32, the main low-beam radiator 33 and the main low-beam light passing part 34 corresponding thereto are all arranged in a stepped shape.

The above-mentioned main low-beam primary optical element comprises a main low-beam light incident part 31 and a main low-beam light passing part 34, and the auxiliary low-beam primary optical element comprises an auxiliary low-beam light incident part 41 and an auxiliary low-beam light passing part 44. The above-mentioned low-beam illumination module further comprises a main low-beam circuit board 32, a main low-beam radiator 33, an auxiliary low-beam circuit board 42, and an auxiliary low-beam radiator 43. The above-mentioned main low-beam light incident part 31, main low-beam circuit board 32, main low-beam radiator 33, main low-beam light passing part 34, auxiliary low-beam light incident part 41, auxiliary low-beam circuit board 42, auxiliary low-beam radiator 43 and the auxiliary low-beam light passing part 44 are of the structures in the prior art, which will not be repeated here since they are not innovations of the present disclosure.

On the basis of the above technical solutions, the opening size of the lens for the low-beam illumination module can be reduced to 10 mm to 15 mm, which greatly reduces the space it occupies, and provides more space for automobile manufacturers to develop their profile shape to meet the diversity of the profile surfaces of vehicle lamps.

In addition, the present disclosure also provides a vehicle including the above-mentioned auxiliary low-beam illumination module or the above-mentioned low-beam illumination module.

It can be seen from the above description that the present disclosure has at least the advantages as follows. The lens unit of the present disclosure has the optical characteristics of a cylindrical lens, and can make parallel incident light pass through the lens unit and then be focused into one line, instead of one focal point, so that even if the light emitting surface of the lens unit, that is, the front surface, is a free-form curved surface extending up and down obliquely, it can realize the illumination light shape that meets requirements of vehicle lamp regulations, and the light emitting effect will not be affected by the inclination of the front surface, as long as the focal line is a straight line perpendicular to the light emitting direction of the lens unit. One surface of the lens unit of the present disclosure is a free-form curved surface and may make the lens very wide, especially suitable for the lens with low-beam broadening light shape, which enables the low-beam light shape to be wider and more uniform. In addition, the lens unit is suitable for the front surface 22 with a relatively small up-down opening size, a relatively large left-right bending curvature, and even with an inclination angle in up-down direction. Especially for the photoconductive-type vehicle lamp (vehicle lamp with the long strip-shaped light emitting surface), the rear surface 21 can be obtained according to a given slender front surface 22 extending left and right or extending obliquely and a given focal line 23, so as to obtain the entire lens unit, and therefore the problem of light allocation can be easily solved and the flattening and diversified design of the vehicle lamp is realized, which provides more space for the automobile manufacturers to develop their profile shape and satisfy the diversification of the profile surface of the vehicle lamps. The present disclosure breaks through the traditional design idea of low-beam, and the design process is more convenient.

The preferred embodiments of the present disclosure have been described in detail above with reference to the drawings. However, the present disclosure is not limited to the specific details of the above-mentioned embodiments. Within the scope of the technical concept of the present disclosure, various simple modifications can be made to the technical solutions of the present disclosure, with these simple modifications all falling within the protection scope of the present disclosure.

In addition, it should be noted that, the specific technical features described in the above-mentioned embodiments can be combined in any suitable manner without contradiction. In order to avoid unnecessary repetition, the combination methods will not be specified again in the present disclosure.

In addition, the various embodiments of the present disclosure can also be arbitrarily combined, which should also be regarded as the contents disclosed in the present disclosure, as long as they do not violate the spirit of the present disclosure.

INDUSTRIAL APPLICABILITY

The lens unit provided by the present disclosure has the optical characteristics of a cylindrical lens. It is possible to make the lens very wide, which is especially suitable for a lens with a low-beam broadening light shape, so as to make the low-beam light shape wider and more uniform. In addition, it is suitable for the front surface with a relatively small up-down opening size, a relatively large left-right bending curvature, and even with an inclination angle in the up-down direction. Especially for the photoconductive-type vehicle lamp, the rear surface can be obtained according to a given slender front surface extending left and right or extending obliquely and a given focal line, so as to obtain the entire lens unit. Therefore the problem of light allocation can be easily solved and the flattening and diversified design of the vehicle lamp is realized, which provides more space for the automobile manufacturers to develop their profile shape and satisfy the diversification of the profile surface of the vehicle lamps. The auxiliary low-beam illumination module, the lens for the low-beam illumination module, the low-beam illumination module, and the vehicle provided by the present disclosure can also be designed on the basis of free-form curved surfaces, so as to achieve flattened and diversified designs.

The lens unit, the auxiliary low-beam module, the lens, the low-beam illumination module and the vehicle provided by the present disclosure can be applied to various industrial applications and are reproducible.

What is claimed is:

1. An auxiliary low-beam illumination module, comprising an auxiliary low-beam primary optical element and a lens unit, wherein a focal line is arranged on a lower boundary of a light emitting surface of the auxiliary low-beam primary optical element;

wherein the lens unit comprises a rear surface and a front surface, wherein the lens unit has the focal line, the focal line is a straight line perpendicular to a light emitting direction of the lens unit, the rear surface and the front surface are configured to project light rays passing through the focal line into parallel light rays, and the front surface is a free-form curved surface.

2. The auxiliary low-beam illumination module according to claim 1, wherein light rays emitted by the auxiliary low-beam primary optical element are projected by the lens unit to form an auxiliary low-beam light shape with a low-beam horizontal cut-off line, and the auxiliary low-beam light shape can be superimposed with a main low-beam light shape to form a complete low-beam light shape.

3. A lens for a low-beam illumination module, comprising a main low-beam forming part and an auxiliary low-beam forming part, wherein the main low-beam forming part comprises a main low-beam light incident surface and a main low-beam light emitting surface, the main low-beam light incident surface is formed with at least one point focusing curved surface, the point focusing curved surface and corresponding portion of the main low-beam light emitting surface are configured to project light rays passing through a same point into parallel light rays, and the auxiliary low-beam forming part is the lens unit according to claim 1.

4. The lens for a low-beam illumination module according to claim 3, wherein the main low-beam forming part and the auxiliary low-beam forming part are provided as an integrally-formed member.

5. The lens for a low-beam illumination module according to claim 4, wherein the main low-beam forming part and the auxiliary low-beam forming part share one light emitting surface, and the light emitting surface is a free-form curved surface.

6. The lens for a low-beam illumination module according to claim 3, wherein the front surface is formed by sweeping an arc along one preset free curve; and the front surface is theft free-form curved surface with a small up-down size and a large left-right curvature.

7. The lens for a low-beam illumination module according to claim 3, wherein an opening size of the lens unit is less than 15 mm.

8. The lens for a low-beam illumination module according to claim 3, wherein the rear surface is a smooth curved surface.

9. The auxiliary low-beam illumination module according to claim 1, wherein the front surface is formed by sweeping an arc along one preset free curve; and the front surface is a free-form curved surface with a small up-down size and a large left-right curvature.

10. The auxiliary low-beam illumination module according to claim 1, wherein an opening size of the lens unit is less than 15 mm.

11. The auxiliary low-beam illumination module according to claim 1, wherein the rear surface is a smooth curved surface.

* * * * *